(12) United States Patent
Fischer et al.

(10) Patent No.: US 6,441,536 B2
(45) Date of Patent: Aug. 27, 2002

(54) WOBBLE MOTOR

(75) Inventors: Bernhard Fischer, Töging A. Inn; Andreas Kappel, Brunnthal; Enrico Ulivieri; Bernhard Gottlieb, both of München; Randolf Mock, Hohenbrunn, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/827,715

(22) Filed: Apr. 6, 2001

(30) Foreign Application Priority Data

Apr. 6, 2000 (DE) .......................... 100 17 138

(51) Int. Cl.⁷ .................................................. H02N 2/00
(52) U.S. Cl. ................................................ 310/323.17
(58) Field of Search ..................................... 310/323.17

(56) References Cited

U.S. PATENT DOCUMENTS

| | | | |
|---|---|---|---|
| 3,585,426 A | * 6/1971 | Newell | 310/49 |
| 3,614,486 A | * 10/1971 | Smiley | 310/323.17 |
| 4,757,223 A | 7/1988 | Ueyama | 310/82 |
| 4,888,515 A | 12/1989 | Tamura | 310/323 |
| 5,079,471 A | 1/1992 | Nygren, Jr. | 310/328 |
| 5,180,209 A | * 1/1993 | Bieri | 299/41 |
| 6,147,856 A | * 11/2000 | Karidis | 361/277 |
| 6,232,700 B1 | * 5/2001 | Kosaka et al. | 310/323.17 |

FOREIGN PATENT DOCUMENTS

| | | | |
|---|---|---|---|
| DE | 27 09 006 A1 | 9/1978 | ............ F16H/25/22 |
| EP | 0 788 664 B1 | 8/1997 | ............ H01L/41/09 |
| JP | 6-105532 | * 4/1994 | ............ H02K/41/06 |
| JP | 11-164572 | * 6/1999 | ............ H02N/2/00 |
| JP | 11-196583 | * 7/1999 | ............ H02N/1/00 |
| WO | WO 97/26702 | 7/1997 | ............ H02N/2/12 |

OTHER PUBLICATIONS

H.–H. Anger: "Piezokeramische Vibroantriebe—eine Übersicht über wesentliche technische Lösungen" [piezo ceramic vibro drives—a compilation of essential technical solutions], Hermsdorfer Technische Mitteilungen, vol. 30, Jun. 1990, No. 78, pp. 2481–2485.

G. Schadebrodt et al.: "The Piezo Traveling Wave Motor, a New Element in Actuation", PCIM, Jul. 1990, pp. 46–50.

Maximilian Fleischer et al.: "Ultraschallmotoren mit piezoelektrischem Antrieb" [Ultrasound motors with piezoelectric actuator], Physik in unserer Zeit, vol. 22, No. 4, pp. 169–174, Dec. 1991.

M. Bexell et al.: "Fabrication and evaluation of a piezoelectric miniature motor", Sensors and Actuators, No. 75, pp. 8–16, Dec. 1999.

M. Bexell et al.: "Characteristics of a piezoelectric miniature motor", Sensors and Actuators, No. 75, pp. 118–130, Dec. 1999.

* cited by examiner

*Primary Examiner*—Thomas M. Dougherty
(74) *Attorney, Agent, or Firm*—Laurence A. Greenberg; Werner H. Stemer; Ralph E. Locher

(57) ABSTRACT

A wobble motor has at least one shaft guided in a rotatably and axially displaceable fashion, and at least one drive ring which surrounds the shaft and can be tilted with respect to a longitudinal axis of the shaft. The at least one guide ring can be displaced in a frictionally locked fashion and free from rotation.

20 Claims, 12 Drawing Sheets

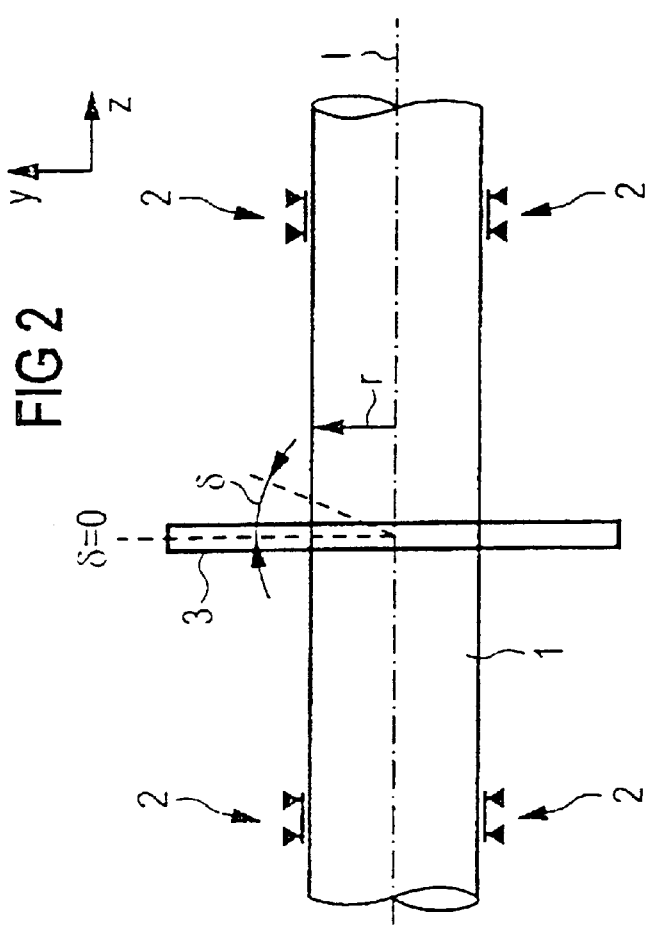
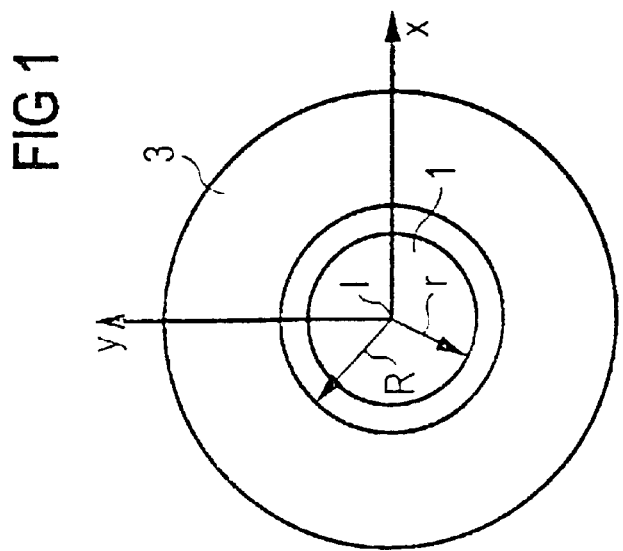

ωt=0°/360°

ωt=90°

ωt=180°

ωt=270°

ωt=0°/360°

ωt=90°

ωt=180°

ωt=270°

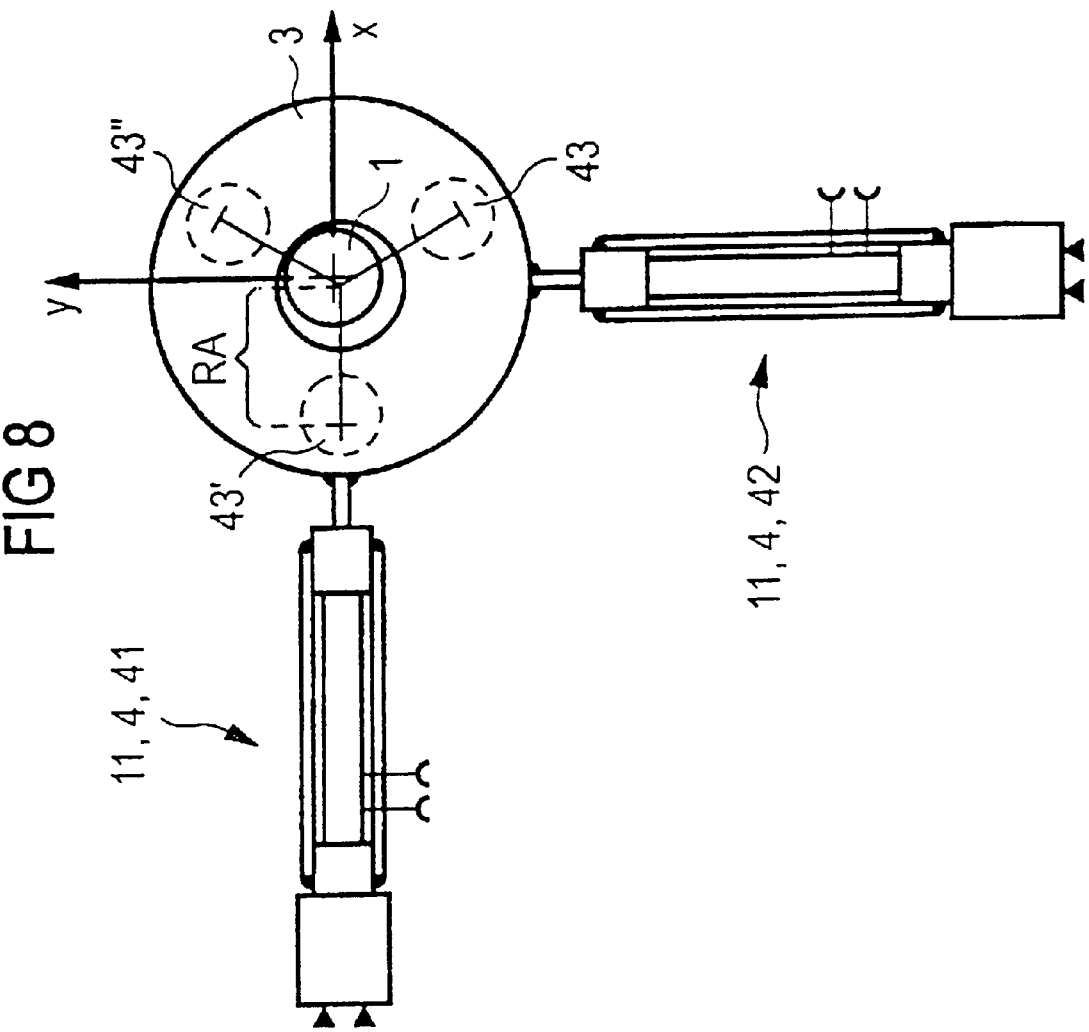
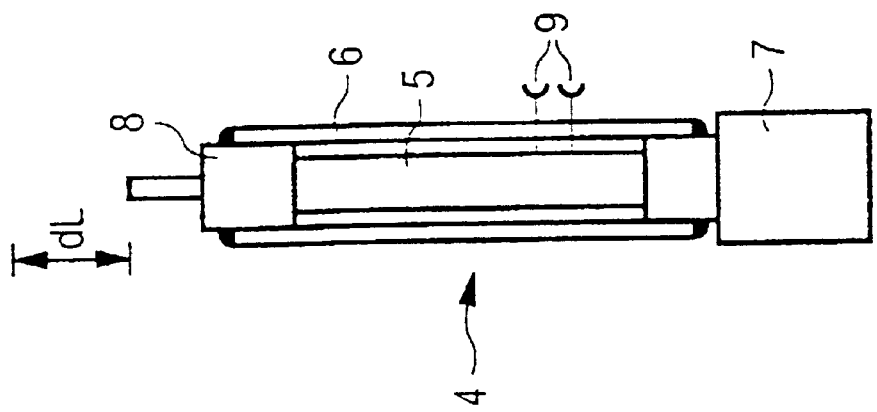

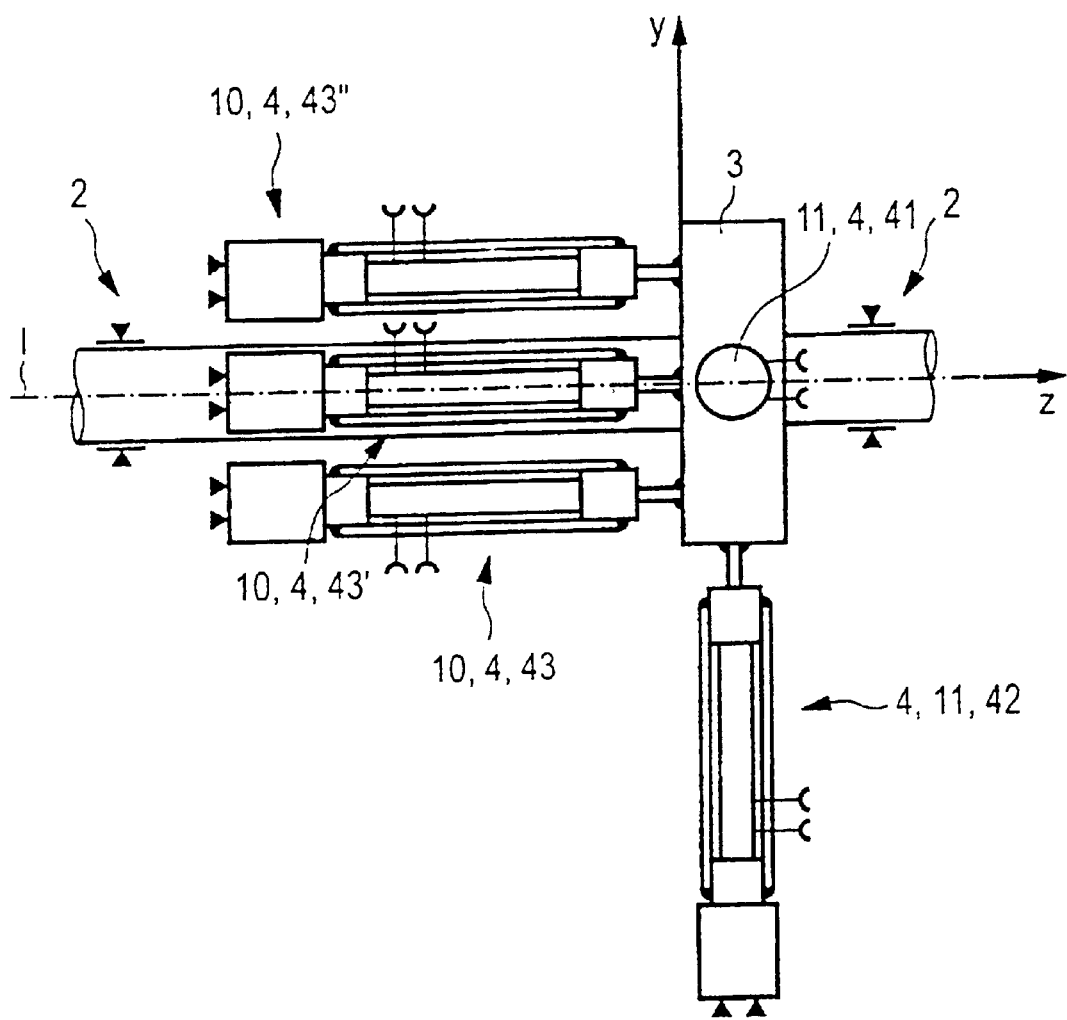

WOBBLE MOTOR

BACKGROUND OF THE INVENTION

FIELD OF THE INVENTION

The invention relates to a wobble motor for linear and/or rotary movements.

Electromagnetic motors are known in which a rotary movement is converted into a linear movement by a gear worm.

The references by M. Bexell, S. Johansson, titled "Fabrication and Evaluation of a Piezoelectric Miniature Motor", Sensors and Actuators 75 (1999) p. 8–16, and M. Bexell, S. Johansson, titled "Characteristics of a Piezoelectric Miniature Motor", Sensors and Actuators 75 (1999) p. 118–130, disclose a miniaturized, "inchworm motor" in which a rotation is effected by contraction and bending of a plurality of piezoelectric elements.

A reference by G. Schadebrodt and B. Salomon, titled "The Piezo Traveling Wave Motor, a New Element in Actuation", PCIM, July 1990, describes a traveling wave motor in which a stator uses the piezoelectric effect to generate a resonant wave motion on its surface, and thus drives a rotor.

A further piezoelectrically driven traveling wave motor is described in European Patent EP 0 788 664 B1.

A reference by M. Fleischer, H. Meixner, titled Ultraschallmotoren mit piezoelektrischem Antrieb [Ultrasonic Motors With Piezoelectric Drive], Physik in unserer Zeit, 22nd annual volume 1991, No. 4, discloses an ultrasonic motor with a piezoelectric drive in the case of which rods excited piezoelectrically in the ultrasonic region drive a cylindrical rotor by asymmetric mounting.

An overview of piezoceramic drives is given in the reference by H. Anger, titled Piezoelektrische Vibroantriebe—eine Übersicht über wesentliche technische Lösungen [Piezoelectric Vibratory Drives—An Overview Of Essential Technical Solutions], Hermsdorfer technische Mitteilungen, 30th annual volume, June 1990, volume 78, pages 2481 to 2485.

Published, Non-Prosecuted German Patent Application DE 27 09 006 A1 discloses a conversion of a rotary movement into a feed movement of a shaft by a plurality of tilted rolling members, the rolling members being driven to rotate about an axis.

SUMMARY OF THE INVENTION

It is accordingly an object of the invention to provide a Wobble motor which overcomes the above-mentioned disadvantages of the prior art devices and methods of this general type, which is of light-construction and efficient, in particular for generating a high torque in conjunction with a low rotational speed without an additional transmission.

With the foregoing and other objects in view there is provided, in accordance with the invention, a wobble motor. The wobble motor contains at least one shaft guided in a rotatably and axially displaceable fashion. At least one drive ring surrounds the shaft and is tilted with respect to a longitudinal axis of the shaft. The at least one drive ring is displaced about the shaft in a frictionally locked fashion and free from rotation.

The wobble motor has at least one shaft guided in a rotably and axially displaceable fashion. Furthermore, at least one drive ring is present which surrounds the shaft. The shaft can be guided, for example, via a bearing or without a bearing by a plurality of drive rings.

The at least one drive ring can, moreover, be tilted with respect to a longitudinal axis of the shaft. It can be displaced about the shaft in a frictionally locked fashion and at least partly free from rotation.

The displacement movement can be periodic, for example circular or elliptical. Of course, only segments of such movements can also be executed.

"Free from rotation" is taken to mean that the drive ring can be displaced or driven as a whole around the shaft, but at least a part of the drive ring is not substantially rotated about an axis fixed in the body. It is possible in this case for the non-rotating part of the drive ring, for example an outer annular shell, to be freely rotatable against another part, for example an inner annular shell. The displacement of the drive ring therefore takes place in a fashion free from rotation.

The frictional lock between the drive ring and shaft ensures that the movement of the drive ring is transmitted to the shaft. This does not exclude the possibility of freewheeling by canceling the frictional locking.

The tilting effects a relative inclination of the drive ring in the direction of the longitudinal axis of the shaft. The tilting can be expressed as a rule by a tilting angle, which can be constant or variable in time.

It may be assumed for the purpose of better understanding in the following description that the longitudinal axis of the shaft is situated on the z-axis, and that the drive ring is disc-shaped. In the case of a tilting angle d=0 ("rest position"), the drive ring may be aligned with a plane ("ring plane") which corresponds to the (x, y)-plane. However, the wobble motor is not, of course, limited to this configuration, but can also have, for example, other tilted positions or differently formed drive rings.

The wobble motor can be driven in the operating modes of pure linear drive, pure rotary drive or a combination of these two types of operation.

A plurality of drive rings can be moved independently of one another or in a fashion coupled to one another.

The wobble motor has the advantage that it is of low wear, since only rolling friction occurs. Furthermore, only a slight noise is developed. There is also the advantage that a high drive torque can be transmitted. Again, to its advantage the wobble motor can be controlled universally, for example in stepwise or continuous fashion with respect to its direction of rotation and feed direction, its rotational speed and feed rate, and its torque and feed momentum. In addition, the rotary movement and linear feed can be implemented separately or in combination. Self locking or freewheeling can also be controlled.

Furthermore, a low structural weight results in conjunction with a compact configuration, inter alia because no transmission is required.

It is also possible to achieve a favorable high efficiency. Short run up and stopping times in the millisecond range can likewise be realized.

The drive ring of the wobble motor is tilted with respect to the shaft by at least one tilting device having at least one actuator. It is advantageous when the tilting device contains at least two linear actuators. Two drive rings can be tilted by in each case one tilting device having in each case two linear actuators, or by a common tilting device having two actuators. A comparatively simple control of the tilting movement, for example by overlapping of linear movements, is possible through the use of at least two linear actuators.

It is particularly advantageous when the preferably linear actuators of the tilting device are aligned substantially parallel to the longitudinal axis of the machine, because this results in a further simplified control of the tilting movement.

It is also advantageous for the purpose of simple control of the tilting movement when the actuators of the tilting device are fitted in an angularly symmetrical fashion and at the same distance with reference to the center of the drive ring.

Advantageous for the purpose of simple control is a tilting device having three actuators, in particular fitted in an annularly symmetrical fashion and at the same distance with reference to the center of the drive ring.

It is also favorable when the at least one drive ring can be displaced about the shaft by at least one drive device containing at least two actuators which are not collinearly aligned. It is thereby possible in a simple way to execute any desired movement in a plane. Simple movement in a plane is ensured particularly in the case of a configuration of the actuators of the respective drive device perpendicular to the longitudinal axis and at right angles to one another.

Drive devices and tilting devices can also be coupled permanently, for example mechanically, and be moved by common actuators.

It is favorable when at least one actuator, in particular all the actuators, is an electromechanical actuator. In the case of an electromechanical actuator, a change in volume, and thereby a stroke, can be implemented by an electric control variable, for example a current or a voltage. One example of an electromechanical actuator is a piezoelectric, magnetostrictive or electrostrictive actuator. Such an actuator has the advantage that it can be driven very quickly and precisely.

A piezoelectric multilayer actuator in particular is cost-effective, can be produced at high precision and can be moved precisely.

It can be advantageous to use a hydraulic or electromagnetic actuator in order to achieve a cost-effective wobble motor.

It is particularly advantageous when the wobble motor has at least one further drive ring at least parallel to a first drive ring. The torque of the shaft can thereby be increased.

It is particularly advantageous in this case when the two drive rings are supported against one another by at least one tilting device, because this results in a space-saving and cost-effective configuration. However, such a positioning of the drive rings and tilting device is not mandatory.

It is also advantageous when the wobble motor has at least a third drive ring which is parallel to the first and to the further drive ring. This renders it possible to operate the shaft in a fashion free from torque and without a separate bearing. In this case, the shaft can be guided exclusively by the drive rings themselves.

It is particularly advantageous in this case when the further (middle) drive ring is supported both against the first drive ring and against the third drive ring with the aid of a tilting device in each case, because this results in a space-saving and cost-effective configuration. However, such a positioning of the drive rings and tilting device is not mandatory.

In accordance with an added feature of the invention, a respective contact point of the first drive ring and the second drive ring with the shaft is rotated by 180° about the longitudinal axis.

In accordance with another feature of the invention, the shaft is guided through the first drive ring, the second drive ring and the third drive ring without torques.

In accordance with an additional feature of the invention, at least one bearing is provided and the shaft is guided through the at least one bearing.

In accordance with a further feature of the invention, the drive ring has a freely rotatable inner annular shell bearing against the shaft.

It can be advantageous for the purpose of improved guidance, in particular when there are less than three drive rings or an configuration of three or more drive rings which is not free from torque, if the shaft is guided through at least one bearing, in particular two bearings. The selection of the bearing is not limited, but permits an axial movement and a rotary movement of the shaft therein, for example in the form of sliding or rolling bearings. In this case, a position of the shaft that is characterized thus only partially is sufficient.

With the foregoing and other objects in view there is provided, in accordance with the invention, a method for driving a shaft. The method includes the steps of displacing at least one drive ring in an at least partially periodic movement about the shaft in a frictionally locked fashion free from rotation; and titling the at least one drive ring with respect to a longitudinal axis of the shaft.

In accordance with an added mode of the invention, there is the step of displacing the at least one drive ring perpendicularly about the longitudinal axis of the shaft at least temporarily in accordance with one of:

$$x=-(R-r)\cdot\cos(\omega t) y=(R-r)\cdot\sin(\omega t),$$

and $$x=-(R-r)\cdot\cos(\omega t) y=-(R-r)\cdot\sin(\omega t),$$

where:

r is a radius of the shaft; and

R is a radius of the at least one drive ring.

It is favorable for uniform operation when the drive ring is displaced at least partially periodically, in particular circularly, in a plane in a perpendicular fashion about the longitudinal axis on the shaft. Because of the stiffness of the drive ring, each point on the drive ring executes the same movement.

It is advantageous for the production of the uniform linear movement of the shaft when the drive ring is also periodically tilted.

It is particularly favorable when the drive ring is tilted periodically at an angular frequency hat corresponds to an angle of frequency of a periodic displacement of the drive ring, if appropriate displaced by a phase angle.

The shaft can be set simply and with a constant speed, in particular by tilting the drive ring by selecting a phase angle in the range [0;π].

It is favorable for the purpose of simple driving using a small angle approximation when a tilting angle is less than 2°, in particular less than 0.1°.

Other features which are considered as characteristic for the invention are set forth in the appended claims.

Although the invention is illustrated and described herein as embodied in a Wobble motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a plan view of a drive ring and a shaft of a wobble motor according to the invention;

FIG. 2 is a side-elevational view of the drive ring, the shaft and bearing of the wobble motor;

FIG. 7 is a side-elevational view of an actuator;

FIG. 8 is a plan view of an embodiment of the wobble motor;

FIG. 9 is a side-elevational view of the wobble motor shown in FIG. 8;

DESCRIPTION OF THE PREFERRED EMBODIMENTS

Figure 3:
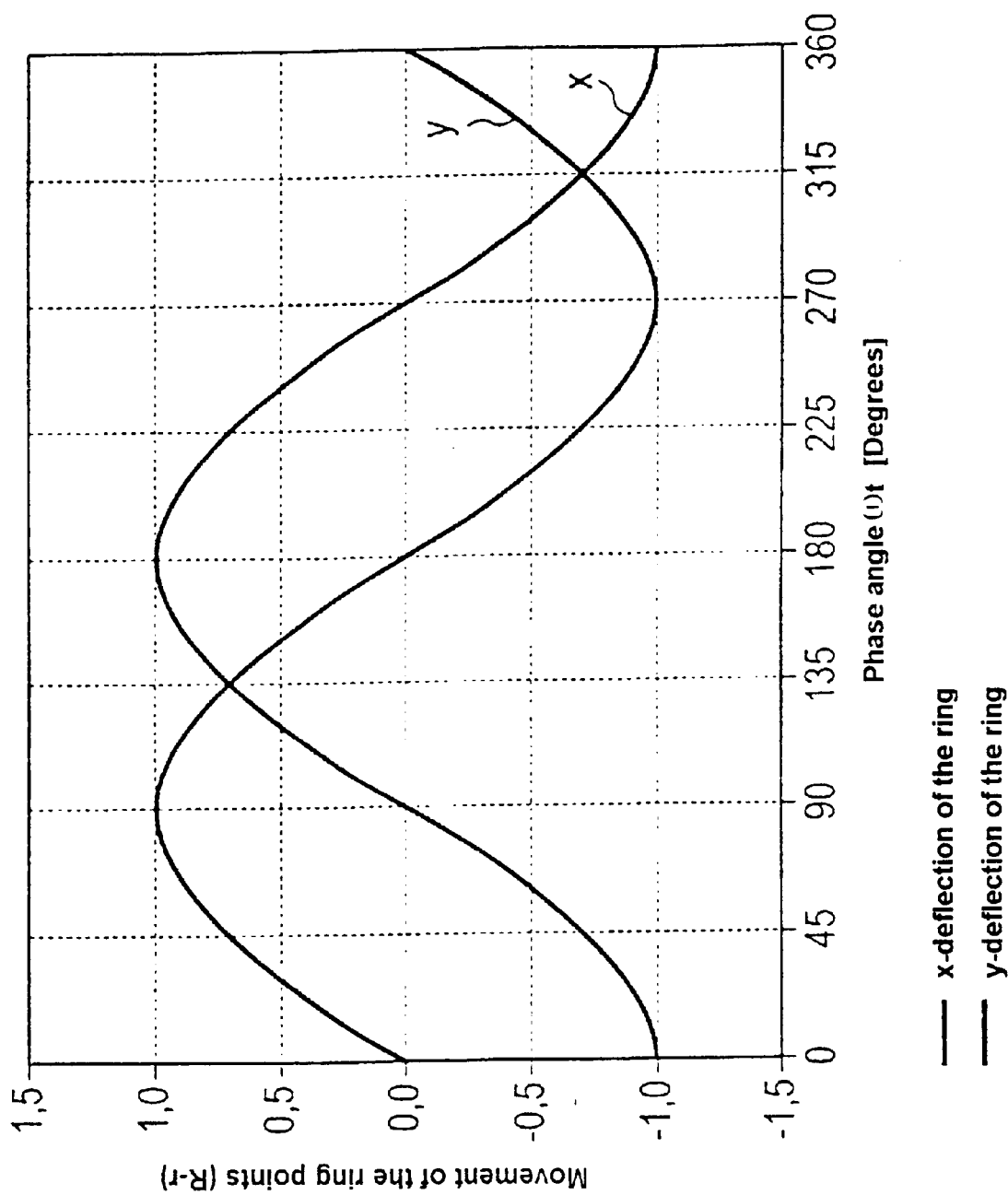
FIG. 3 is a graph showing a movement of the drive ring.
Figure 4A:
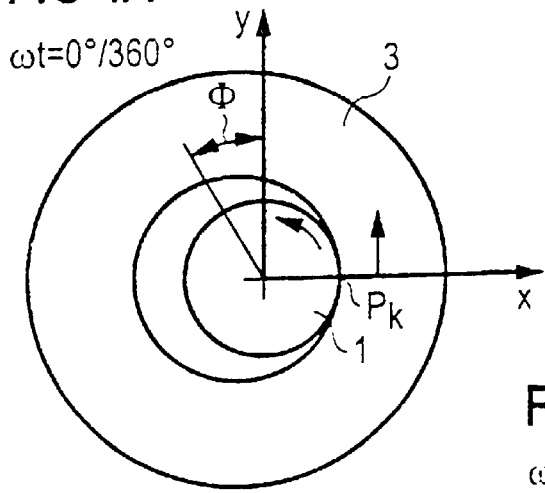
FIGS. 4a to 4d are plan views showing various positions of the wobble motor.
Figure 4B:
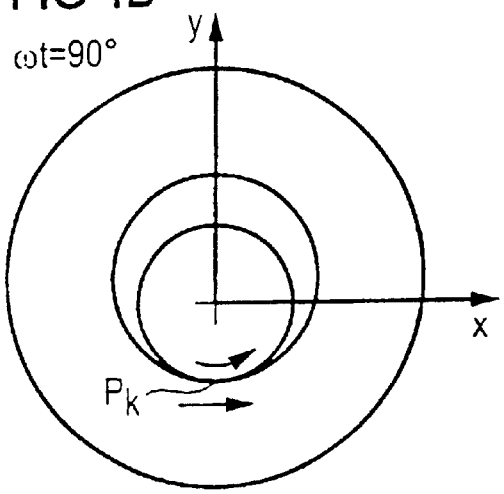
Figure 4C:
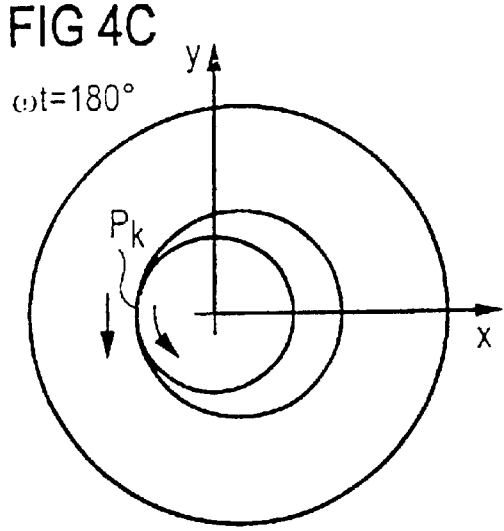
Figure 4D:
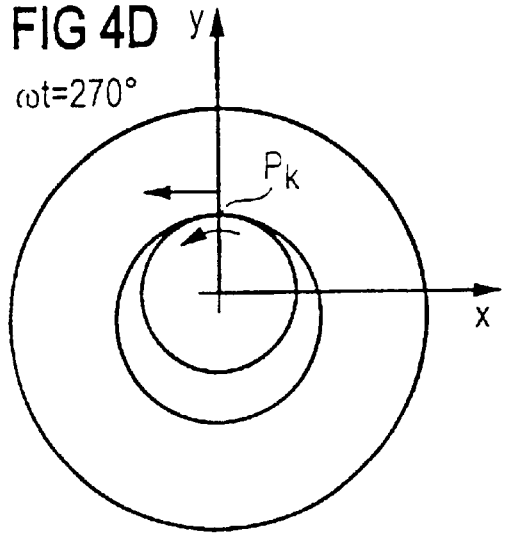

In all the figures of the drawing, sub-features and integral parts that correspond to one another bear the same reference symbol in each case. Referring now to the figures of the drawing in detail and first, particularly, to FIG. 1 thereof, there is shown a plan view of an (x,y)-plane of a drive ring 3 and a shaft 1 of a wobble motor.

In this exemplary embodiment and the following ones, the shaft 1 of radius r is surrounded by the stiff, disc-shaped drive ring 3 of inner radius R (R>r). The drive ring 3 is in a rest position (δ=0) in the (x,y)-plane. A longitudinal axis I of the shaft 1 is aligned in a z-direction.

This illustration serves for a better description and is not restrictive.

FIG. 2 shows a side view of the drive ring 3, the shaft 1 and two bearings 2 of the wobble motor.

The shaft 1 is supported with close tolerance by the pair of bearings 2 such that it can be displaced rotatably and axially. The bearings 2 can be rolling bearings or, preferably, sliding bearings, for example. The drive ring 3 can be displaced in the x-direction and y-direction and tilted independently thereof at a tilting angle δ with respect to the (x,y) -plane.

FIG. 3 shows, stretching over a period, a plot of a movement, normalized to (R–r), of the points of the drive ring 3 ("ring points") against a phase angle (ωt) in degrees at an angular frequency ω.

In order to carry out the displacement movement, the drive ring 3 is moved periodically, by maintaining frictional locking, about the shaft 1 in the x-direction and the y-direction in accordance with:

$$x=-(R-r)\cdot\cos(\omega t) y=(R-r)\cdot\sin(\omega t) \qquad [1]$$

The drive ring 3 thereby describes a circular displacement movement, free from rotation, in the (x,y)-plane at an angular frequency ω. A phase angle (ωt) can be defined correspondingly.

FIGS. 4a to 4d represent in plan view instantaneous pictures for various phase angles of the shaft 1 and the drive ring 3 according to FIG. 1: (ωt)=0° and 360° in FIG. 4a, (ωt)=90° in FIG. 4b, (ωt)=180° in FIG. 4c, and (ωt)=270° in FIG. 4d. The arrows indicate the instantaneous direction of movement, that is to say the direction of the velocity vectors, of the shaft 1 and drive ring 3.

Assuming that there is a sufficiently large pressure force or friction force between the drive ring 3 and the shaft 1, the circular displacement movement of the drive ring 3 in accordance with equation [1] effects uniform rolling of the shaft 1 on the inner surface of the drive ring 3, as a result of which the shaft 1 is set into rotation. The higher the friction force between the drive ring 3 and the shaft 1, the greater is the maximum torque which can be transmitted on the shaft 1.

The rotation of the shaft 1 ("rotary forward drive"), measured in an angle change ΔΦ of the shaft 1 per period of movement of the drive ring 3, is a function of the difference in radius (R–r) between the shaft 1 and the drive ring 3 in accordance with $$\Delta\Phi=360°\cdot(R-r)/r. \qquad [2]$$

Thus, for example, the shaft 1 is rotated once about its longitudinal axis I in a revolving movement of the drive ring 3 for the case in which the inner radius R of the drive ring 3 is twice as large as the radius r of the shaft 1.

The result for the rotational speed n of the shaft 1 is:

$$n=\omega/(2\pi)\cdot(R-r)/r. \qquad [3]$$

The angle $\Phi_k$ of the point Pk perpendicular to the longitudinal axis I at which the shaft 1 is instantaneously in contact with the drive ring 3 ("contact point") is yielded in accordance with:

$$\Phi_k=-\omega\cdot t. \qquad [4]$$

Figure 5:
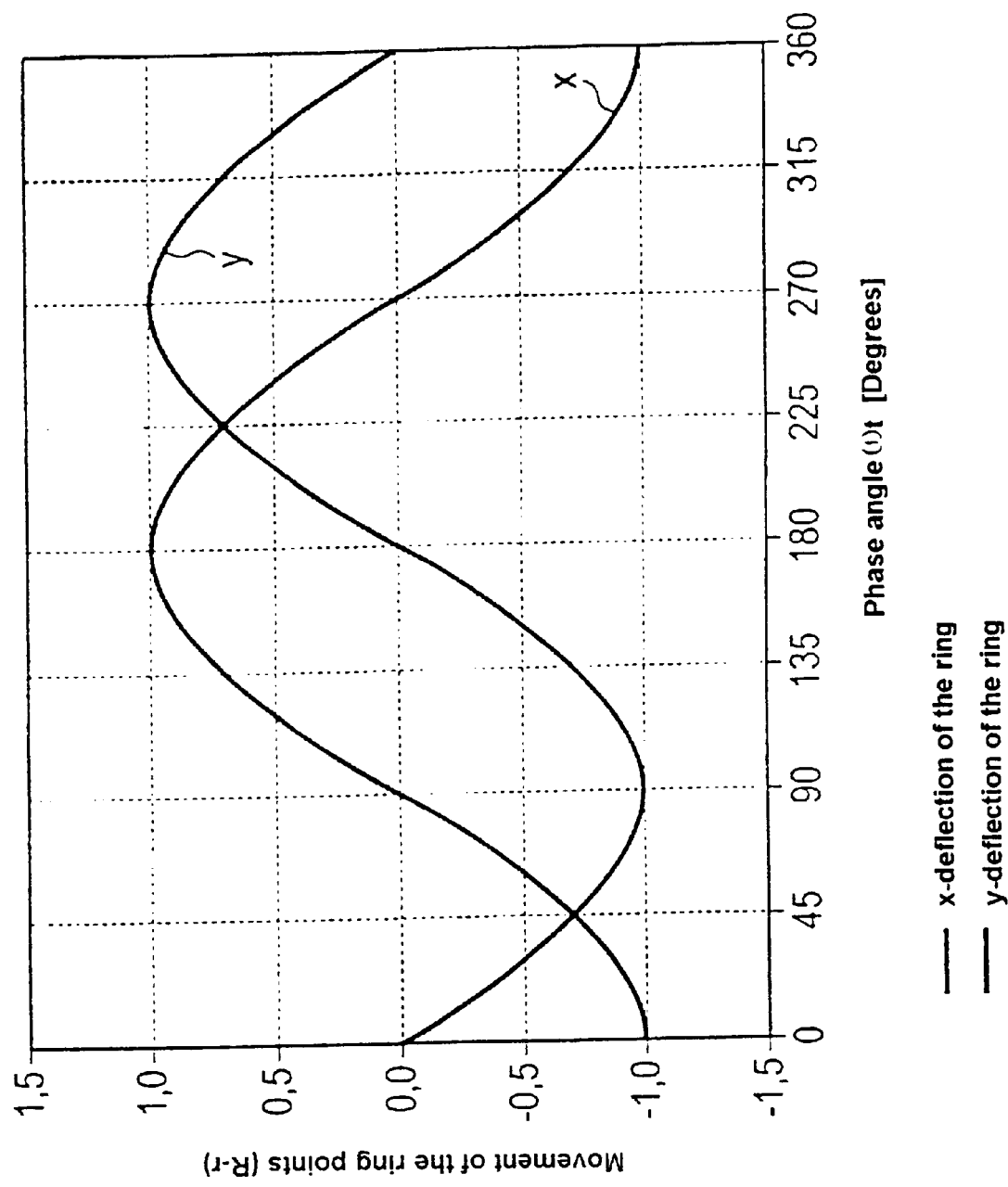
FIG. 5 is a graph showing an inverted movement of the drive ring.

FIG. 5 shows a plot analogous to FIG. 3 of the ring points, normalized to (R–r), against the phase angle (ωt) for an inverted direction of rotation of the shaft 1.

The drive ring 3 is displaced for this purpose in accordance with:

$$x=-(R-r)\cdot\cos(\omega t) y=-(R-r)\cdot\sin(\omega t) \qquad [5]$$

It may be seen from comparison with equation [1] that only the movement of the drive ring 3 has been inverted in the y-direction for the purpose of commutating the direction of rotation, that is to say the phase angles of the x and y-drive signals have been changed by 180° relative to one another by comparison with the original direction of rotation.

Figure 6A:
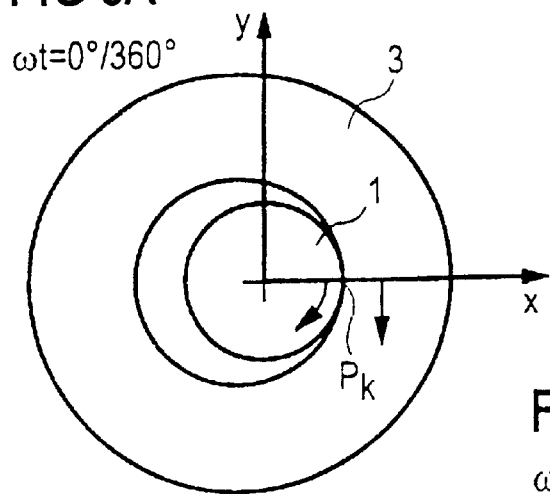
FIGS. 6a to 6d are plan views showing various positions of the wobble motor during an inverted movement.
Figure 6B:
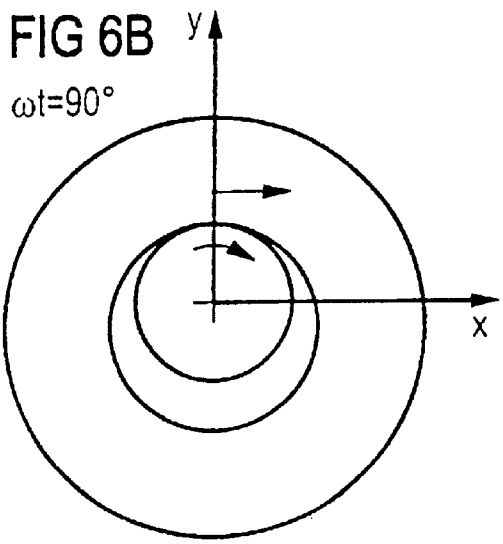
Figure 6C:
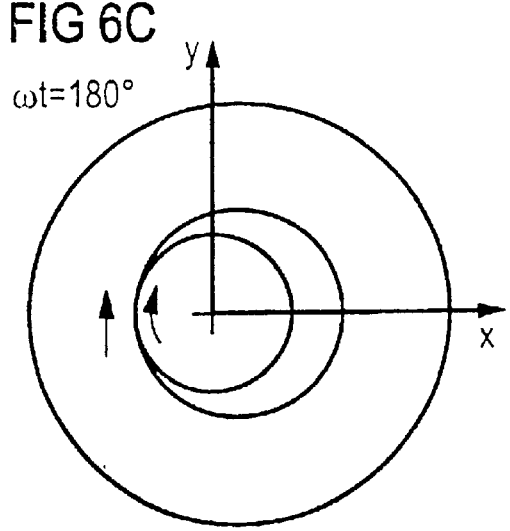
Figure 6D:
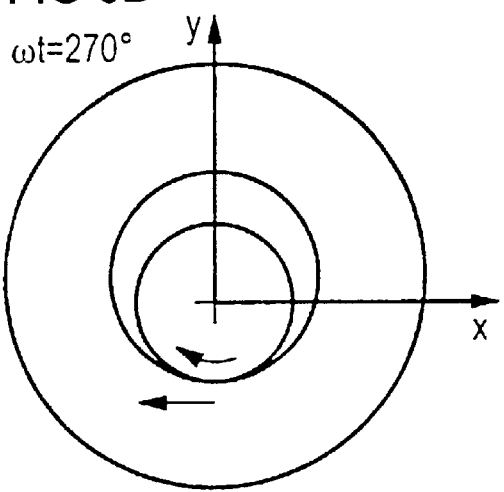

In a way similar to FIGS. 4a to 4d, FIGS. 6a to 6d show the instantaneous pictures of the drive ring 3 and the shaft 1 for the phase angles (ωt)=0° in FIG. 6a, (ωt)=90° in FIG. 6b, (ωt)=180° in FIG. 6c and (ωt)=270° in FIG. 6d.

In the case of a sufficiently large pressure force, the movement of the drive ring 3 in accordance with equation [5] in turn produces a uniform rolling movement of the shaft 1 on the drive ring 3, but with an opposite sense of rotation.

The rotary drive ΔΦ is yielded from equation [2] with the reverse sign. The rotational speed n of the shaft 1 corresponds to that of equation [3]. The angle $\Phi_k$ of the contact point Pk develops over time in accordance with:

$$\Phi_k = \omega \cdot t \quad [6]$$

To implement a linear movement, the drive ring 3 is tilted (wobbled) with respect to the longitudinal axis I. For the purpose of explanation, the drive ring 3 is now described in a simplifying way such that it lies in a plane which can be described by the normal vector $\vec{n}$ which is normalized by the length 1 and is generally a function of time. The points $\vec{x}$ on the drive ring 3 therefore satisfy the plane equation $$\vec{n} \cdot \vec{x} = 0. \quad [7]$$

The drive ring 3 is now wobbled as a function of time such that it holds for the normal vector $\vec{n}$ that:

$$\vec{n} = \frac{1}{\sqrt{a^2 + b^2}} \begin{pmatrix} -a \cdot \sin(\Omega t + \gamma) \\ -a \cdot \cos(\Omega t + \gamma) \\ b \end{pmatrix} \quad [8]$$

where $\gamma$ is a general phase angle, $\Omega$ is an angular frequency of the wobble movement, and (a,b)=general amplitudes.

In the case of a pure wobbling movement, in which the origin of the normal vector n is situated at the centroid of the drive ring 3 on the z-axis, the tip of the normal vector $\vec{n}$ is rotated circularly about the z-axis. This pure wobbling movement is generally superimposed on the circular displacement movement.

The movement of a point $\vec{x}_R$ on the inner radius R of the drive ring 3 will now be considered for a small tilting angle d. The coordinates of $\vec{x}_R$ can be described in a small angle approximation (d<2° with tan δ=a/b) with an error <1 per mille by:

$$\vec{x}_R = \begin{pmatrix} R \cdot \cos\varphi \\ R \cdot \sin\varphi \\ z_R \end{pmatrix} \quad [9]$$

The z-coordinate $z_R$ can be determined by substituting $\vec{x}_R$ in the plane equation [7]:

$$z_R = \frac{a \cdot R}{b} \cdot \sin(\Omega t + \gamma + \varphi) \quad [10]$$

Differentiation with respect to time t yields the speed $\dot{z}_R$:

$$\dot{z}_R = \frac{a \cdot R}{b} \cdot \Omega \cdot \cos(\Omega t + \gamma + \varphi) \quad [11]$$

The location on the inside diameter R of the drive ring 3 with the maximum speed $\dot{z}_{R,max}=(a/b)\cdot R\cdot\Omega$ in the positive z-direction changes with time, and its angle coordinate f is located at:

$$\phi = -\Omega t - \gamma \quad [12]$$

The location on the inner radius R of the drive ring 3 with the maximum speed $\dot{z}_{R,max}=(a/b)\cdot R\cdot\Omega$ in the negative z-direction changes in exactly the same way with time. Its angle coordinate f is located at:

$$\phi = \pi - \Omega t - \gamma \quad [13]$$

If the shaft 1 is always kept at the location of the maximum positive z-speed $\dot{z}_{R,max}=(a/b)\cdot R\cdot\Omega$ of the drive ring 3 in a fashion making frictional contact therewith, the frictional locking produces a linear displacement of the shaft 1 in the positive z-direction (corresponding to $\phi=-\Omega\cdot t-\gamma$) at the same speed $\dot{z}_{R,max}$.

Consequently, for the shaft 1 to move linearly at a speed $\dot{z}_R$ it must be kept in contact at the location on the inner radius of the drive ring 3 with the corresponding speed $\dot{z}_R$. The pressure force is to be chosen in this case so as to ensure sufficient transmission of force from the drive ring 3 to the shaft 1.

Two cases are considered for implementing a combined linear and rotary movement of the shaft 1. First a rotary movement in a positive angular direction is discussed. The drive ring 3 is moved in accordance with equation [1], and thereby drives the shaft 1 in accordance with equation [2] to rotate in the positive angular direction. The angle coordinate $\Phi_k$ for the contact point Pk is described by equation [4].

The drive ring 3 is now wobbled simultaneously in accordance with equation [8] at the angular frequency $\Omega=\omega$ of the x-y displacement movement, if appropriate with a suitable phase angle $\gamma$ with respect thereto.

The angular position $\phi$ of maximum speed $\dot{z}_{R,max}$, and thus of maximum linear displacement in the direction of the positive z-axis, is at $f=-\Omega\cdot t-\gamma$ in accordance with equation [12]. Equating equation [4] and equation [12] yields the phase angle $\gamma$ at which a simultaneous linear movement of the shaft 1 in the direction of the positive z-axis is achieved for a rotation of the shaft 1 in the positive angular direction:

$$\gamma = 0. \quad [14]$$

By analogy, equation [4] and equation [13] must be satisfied simultaneously for the linear movement of the shaft 1 in the direction of the negative z-axis. It must then hold for this case that:

$$\gamma = \pi. \quad [15]$$

Each feed rate $\dot{z}_R$ the shaft 1 in the z-direction can therefore be continuously set between the extreme values $$-\frac{a \cdot R}{b} \cdot \Omega \leq \dot{z}_R \leq \frac{a \cdot R}{b} \cdot \Omega \quad [16]$$

by selecting the phase angle $\gamma$ in the range $[0;\pi]$.

In the case of rotary movement in the negative angular direction, the drive ring 3 is moved in the (x,y)-plane in accordance with equation [5], and thereby drives the shaft 1 to rotate in the negative angular direction, in accordance with $\Omega=-\omega$. The angular coordinate $\phi_k$ of the contact point Pk is described by equation [6].

Equation [6] and equation [12] must be satisfied simultaneously for the linear movement of the shaft 1 in the direction of the positive z-axis in the case of a rotation of the shaft 1 in the negative angular direction. A phase angle $\gamma$ according to equation [14] is yielded therefrom as y=0.

By analogy, $\gamma=\pi$ must hold in accordance with the equation [15] for a simultaneous linear movement in the direction of the negative z-axis in conjunction with simultaneous satisfaction of equations [6] and [13].

Each feed rate $\dot{z}_R$ of the shaft 1 in accordance with equation [16] can likewise be set continuously by selecting the phase angle $\gamma$ in the range $[0;\pi]$.

FIG. 7 shows, as a sectional illustration in side view, a typical configuration of an actuator 4 for moving the drive ring 3.

The actuator 4 contains a piezoelectric multilayer actuator (PMA) 5 used in low-voltage technology, a Bourdon spring 6, a base plate 7 and a cover plate 8. The base plate 7 and the cover plate 8 are suitably fashioned to be connected stiffly, for example by welds, to a housing that is likewise stiff. The PMA 5 is welded into the Bourdon spring 6, which is as soft as possible, between the base plate 7 and cover plate 8 under high compressive pretensioning with a force of approximately 500 N to 1000 N.

A compressive pretensioning of the PMA 5 is expedient in order to avoid exposing the PMA 5 to damaging tensile stresses in highly dynamic operation, which could lead to its destruction. The actuator 4 is deflected by virtue of the fact that the PMA 5 is electrically charged via connecting wires 9. A deflection dl is proportional to the drive voltage at a first approximation (neglecting hysteresis effects that are present).

Normally, the PMA 5 is operated in a unipolar fashion, that is to say only with a positive reflection in its longitudinal direction. However, it is possible to operate the PMA 5 with reverse polarity of the drive voltage up to a restricted voltage level, without depolarizing it. A contraction of the PMA 5 in the longitudinal direction can thereby be achieved.

Such an actuator 4 can advantageously be used to move the above-described forms of movement of the drive ring 3.

A typical set of dimensions for comparatively small drives is: r=1 cm, $R_A$=3 cm, 10 $\mu$m$\leq$dl$\leq$50 $\mu$m. A tilting angle $\delta$ of at most 50 $\mu$m/3 cm=0.096° is yielded therefrom for dl=50 $\mu$m. Of course, the dimensioning is not limited to the order of magnitude of this exemplary embodiment or to the use of the small angle approximation.

Again, the implementation of these forms of movement are not limited to the use of the PMA 5, but it is also possible to use general actuators, for example ones driven in an electromagnetic, magnetostrictive, electrostrictive or else hydraulic fashion.

FIGS. 8 and 9 show a plan view (FIG. 8) and a side view (FIG. 9) of an embodiment of the wobble motor.

The wobble motor uses the shaft 1 of outer radius r which is mounted by the two bearings 2, which are drawn in only symbolically, such that it can rotate about the z-axis and be displaced in the z-direction. It also has a stiff drive ring 3 of inside radius R>r, which lies in the x,y-plane in the rest position ($\delta$=0).

The drive ring 3 can be moved freely with respect to a stiff housing via a total of five piezoelectrically driven actuators 4, 41, 42, 43, 43', 43", and is supported in this housing. The stiff connection between the actuators 4, 41, 42, 43, 43', 43" and the housing is indicated by triangular symbols.

The movements of the actuators 4, 41, 42, 43, 43', 43" can be considered to a good approximation as being independent of one another, since the stiffness of an actuator 4, 41, 42, 43, 43', 43" in the longitudinal direction is very much greater than its bending stiffness.

As illustrated in FIG. 8, the drive ring 3 can be displaced by a maximum deflection dl of the actuator 4 in each case by the actuator 4, 41 in the x-direction and by a further actuator 4, 42 in the y-direction. These two actuators 41, 42 are parts of a drive device 11 for displacing the drive ring 3 about the shaft 1.

The condition $$dl > 2 \cdot (R-r) \qquad [17]$$

is to be observed in order always to ensure an adequate pressure force between the drive ring 3 and shaft 1 by suitable driving of the actuators 41, 42. A rotary movement of the shaft 1 in accordance with the principle described above can be achieved by suitable initial mounting of the drive ring 3 and by suitable driving stresses of the actuators 4, 41, 42.

The drive ring 3 is tilted ("wobbled") with respect to the (x,y)-plane, preferably in accordance with equations [7], [8], with a suitable phase relationship $\gamma$ relative to the (x, y)-movement in order to implement a linear movement of the shaft 1 in the z-direction.

The tilting movement is controlled by a tilting unit 10 which contains three actuators 4, 43, 43', 43". As shown in FIG. 8, the actuators 43, 43', 43" are fitted with angular symmetry and at the same distance RA about the center of the bore of the drive ring 3, and aligned parallel to the z-axis. The precise setting of the tilting movement is achieved by a suitable control voltage at the actuators 43, 43', 43".

It is, of course, also possible to use more than three actuators 43, 43', 43", expediently, but not necessarily, with a constant angular distance from one another and at a fixed radius $R_A$ from the center of the bore. It is also possible to use less than three actuators, for example, two actuators together with a freely supported rod, but they are comparatively complicated in their capacity to be driven.

If the time-dependent voltage profiles $U_{43}$, $U_{43'}$, $U_{43''}$ where $$U_{43}(t) = \frac{U_{max}}{2} \cdot (1 + \sin(\Omega t + \gamma + \pi/6)) \qquad [18]$$

$$U_{43'}(t) = \frac{U_{max}}{2} \cdot (1 + \sin(\Omega t + \gamma + \pi))$$

$$U_{43''}(t) = \frac{U_{max}}{2} \cdot (1 + \sin(\Omega t + \gamma - \pi/6))$$

are applied to the three actuators 43, 43', 43" of the tilting unit 10, the coordinates of the corresponding connecting points of these actuators 43, 43', 43" relative to the drive ring 3 are described by the vectors $$\vec{r}_{43} = \begin{pmatrix} R_A \cos\left(\frac{\pi}{6}\right) \\ R_A \sin\left(\frac{\pi}{6}\right) \\ \frac{dl}{2} \cdot \left(1 + \sin\left(\Omega t + \gamma + \frac{\pi}{6}\right)\right) \end{pmatrix}; \qquad [19]$$

$$\vec{r}_{43'} = \begin{pmatrix} R_A \cos \pi \\ R_A \sin \pi \\ \frac{dl}{2} \cdot (1 + \sin(\Omega t + \gamma + \pi)) \end{pmatrix};$$

$$\vec{r}_{43''} = \begin{pmatrix} R_A \cos\left(-\frac{\pi}{6}\right) \\ R_A \sin\left(-\frac{\pi}{6}\right) \\ \frac{dl}{2} \cdot \left(1 + \sin\left(\Omega t + \gamma - \frac{\pi}{6}\right)\right) \end{pmatrix}.$$

The movement of the plane defined by these vectors is defined in this type of drive by:

$$\vec{n} \cdot \vec{x} - d = 0 \qquad [20]$$

With the time-dependent normal vector, normalized to the length 1, $$\vec{n} = \frac{2}{\sqrt{dl^2 + 4R_A^2}} \begin{pmatrix} -\frac{dl}{2} \cdot \sin(\Omega t + \gamma) \\ -\frac{dl}{2} \cdot \cos(\Omega t + \gamma) \\ R_A \end{pmatrix} \quad [21]$$

and the distance $$d = \frac{dl \cdot R_A}{\sqrt{dl^2 + 4R_A^2}}$$

from the origin of coordinates.

This movement is analogous to the wobbling movement described in equations [7], [8], except that the reference system is described by the distance d. A linear movement in the z-direction at a speed $$-\frac{dl \cdot R}{2R_A} \omega \leq \dot{z} \leq \frac{dl \cdot R}{2R_A} \omega \quad [22]$$

can be superimposed on a counterclockwise or clockwise rotation of the shaft 1 by suitable tuning of $\Omega = \pm\omega$ and $0 \leq \gamma \leq \pi$.

Figure 10:
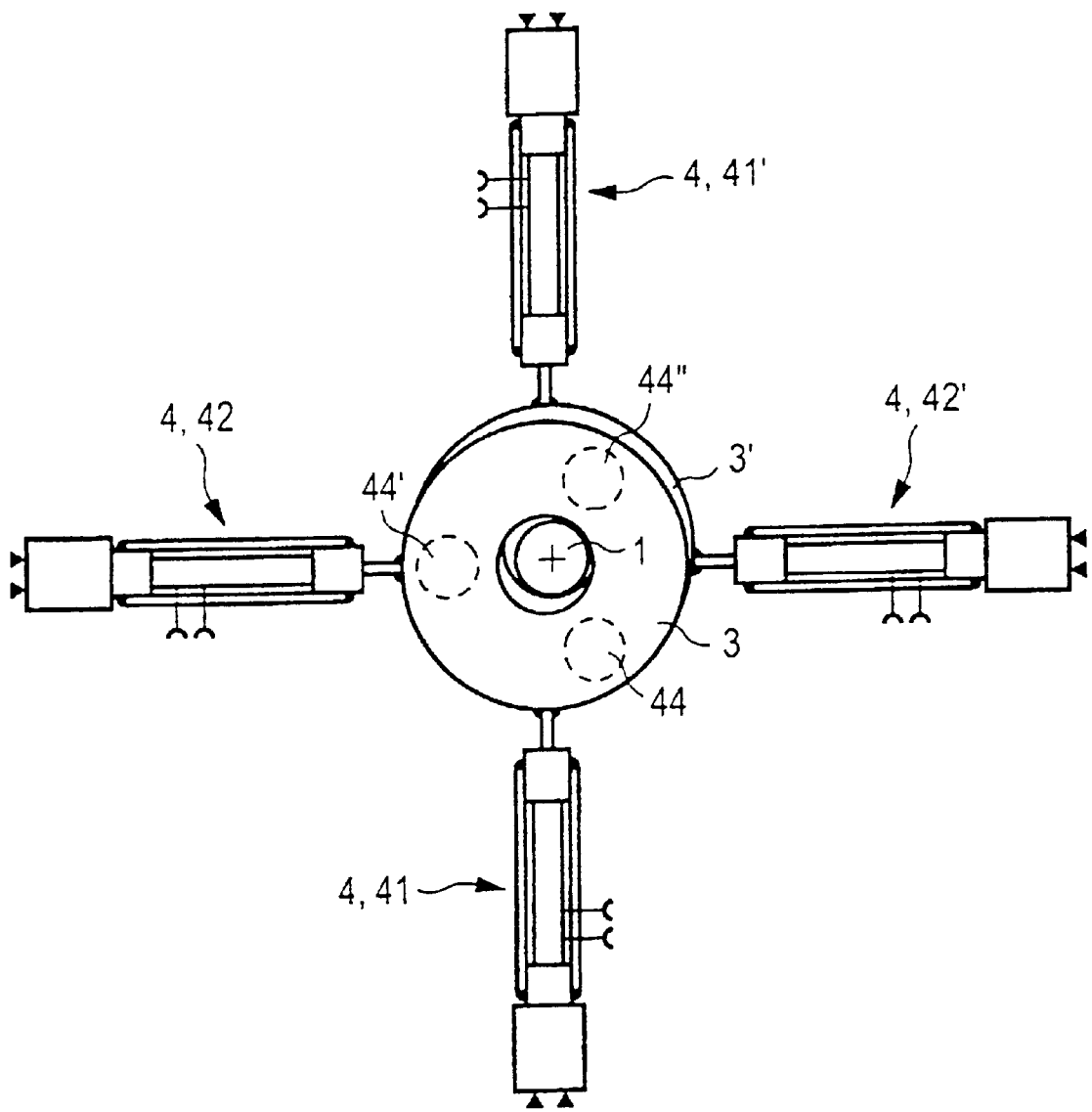
FIG. 10 is a plan view of a further embodiment of the wobble motor.
Figure 11:
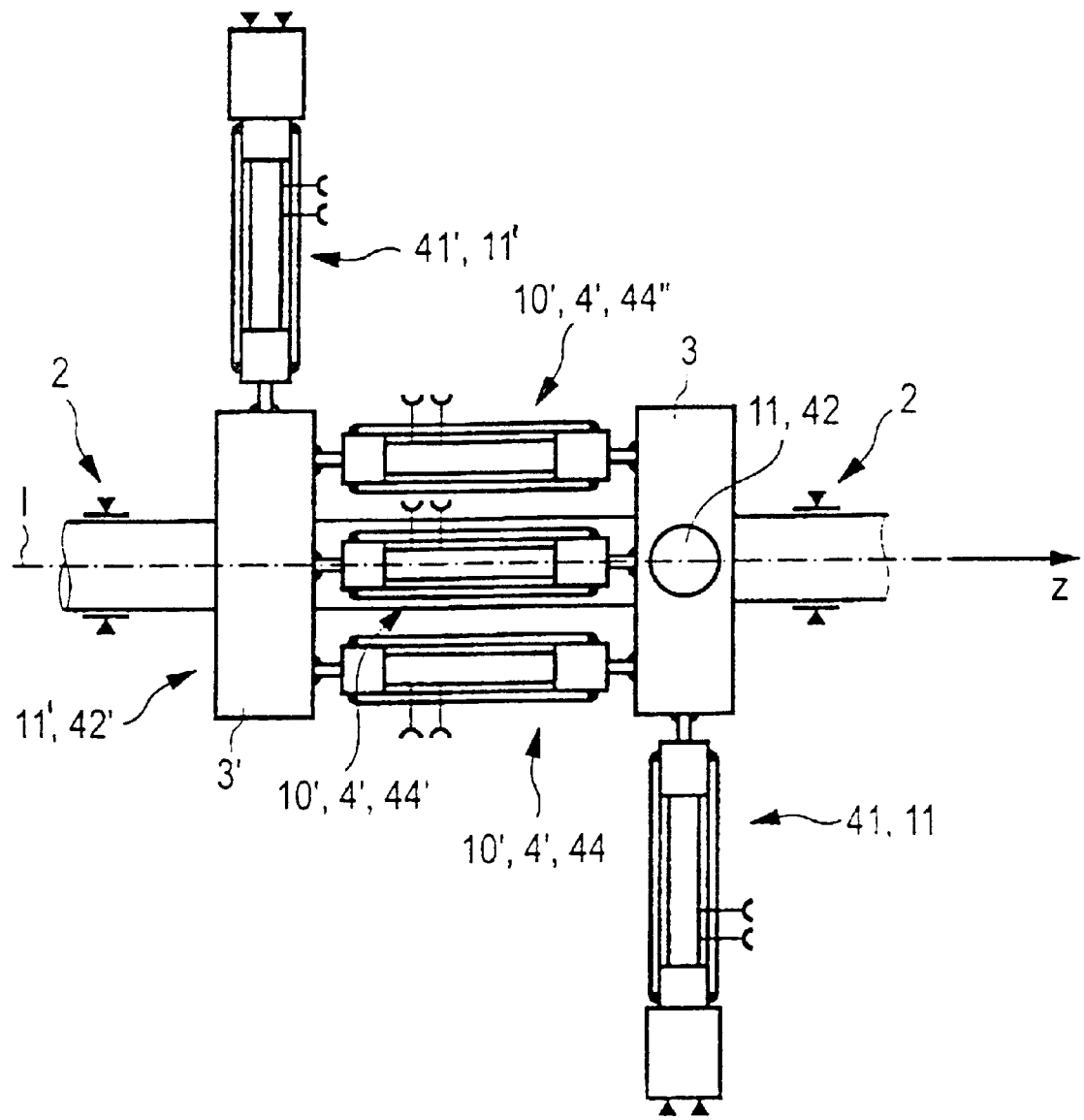
FIG. 11 is a side-elevaitonal view of the wobble motor shown in FIG. 10.

FIGS. 10 and 11 show a further embodiment of a wobble motor having two drive rings 3, 3' coupled in a phase-locked fashion, in plan view (FIG. 10) and in side view (FIG. 11).

A stiff and zero-backlash bearing of the shaft 1 can be achieved by mutual bracing of two drive rings 3, 3', the contact points of the drive rings 3, 3' on the shaft 1 always being situated opposite one another. The movement of the second drive ring 3' is effected by a second displacement unit 11' having two actuators 41', 42'. These actuators 41', 42' are rotated about the z-axis by 180° with respect to the actuators 41, 42 of the first displacement unit 11.

The suitable time-dependent tilting of the drive rings 3, 3' with respect to the (x,y)-plane (wobbling movement) is ensured by a tilting unit 10' which has three actuators 44, 44', 44" which are aligned parallel to one another in the z-direction. One end of an actuator 44, 44', 44" is connected in each case to a drive ring 3, 3'.

Figure 12:
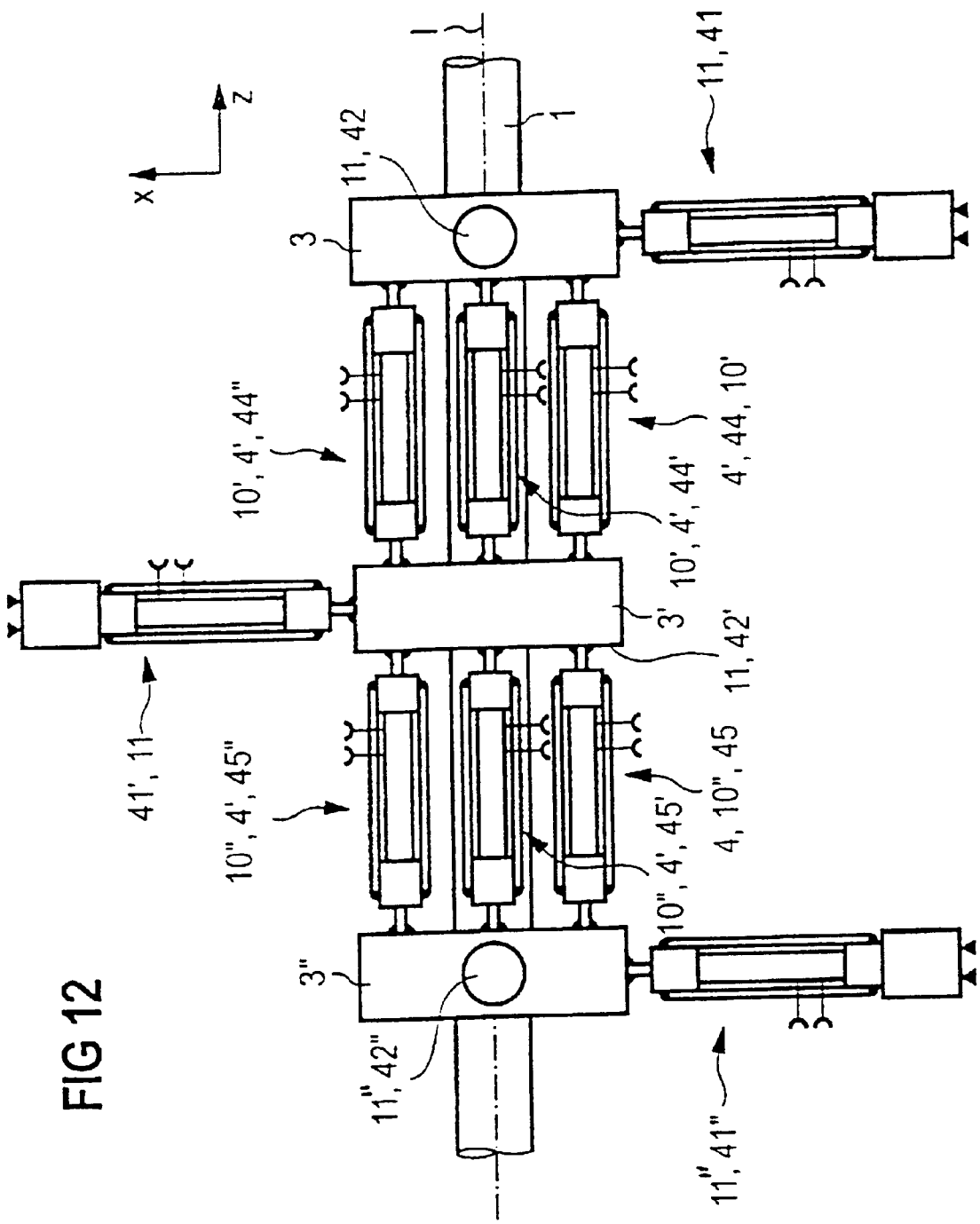
FIG. 12 is a side-elevational view of a further embodiment of the wobble motor.

FIG. 12 shows a side view of a wobble motor having three drive rings 3, 3', 3" coupled in a phase-locked fashion.

In addition to the configuration shown in FIGS. 10 and 11, a third drive ring 3" identical to the first drive ring 3 with two actuators 41", 42" of a third displacement unit 11" is now present. The third drive ring 3" is connected to the further drive ring 3' via a second tilting unit 10" having three actuators 45, 45', 45".

This configuration is particularly advantageous, since no torque is exerted on the shaft 1 owing to the mutual bracing of the drive rings 3. The wobble motor can therefore also be formed without bearings.

The assignment of the actuators to specific displacement units 11, 11', 11" is immaterial. For example, it is also possible for all the actuators 4, 41, 41", 41"', 42, 42', 42" acting in the x and y-directions to be considered as parts of one displacement unit; by analogy, all the actuators 4, 43, 43', 43", 44, 44', 44"', 45, 45', 45" acting in the z-direction can, for example, be considered as part of one tilting device.

Figure 13:
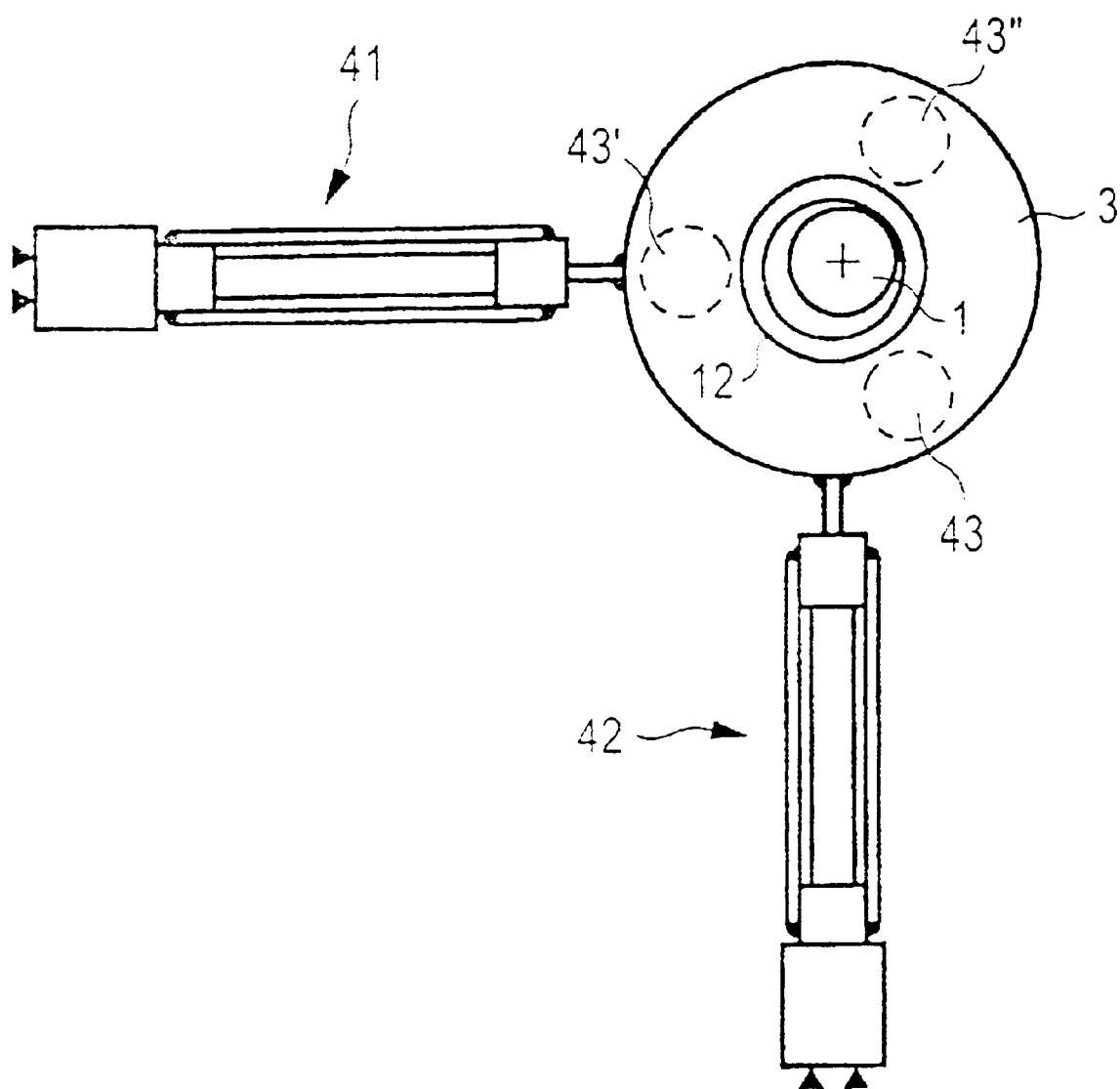
FIG. 13 is a plan view of a further embodiment of the wobble motor.

FIG. 13 shows the top view of a further embodiment of the wobble motor.

By contrast with the motor illustrated in FIG. 8, the drive ring 3 has an inner annular shell 12 which is connected to the remainder of the drive ring 3 via a ball bearing, rolling bearing or sliding bearing. The drive ring 3 bears against the inner annular shell 12 on the shaft 1. The inner annular shell 12 can therefore rotate about an axis leading through the center of the bore.

By virtue of the fact that the rolling movement of the shaft 1 is performed on the freely rotatable inner annular shell 12, torque can now no longer be transmitted to the shaft 1. The linear forward drive of the shaft 1 is maintained, however, because of the wobble movement of the drive ring 3.

Figure 14A:
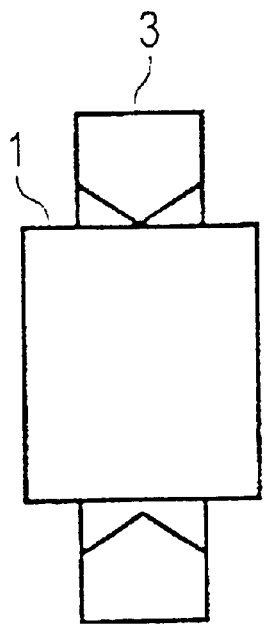
FIGS. 14a to 14c are sectional views of various embodiments of the drive ring.
Figure 14B:
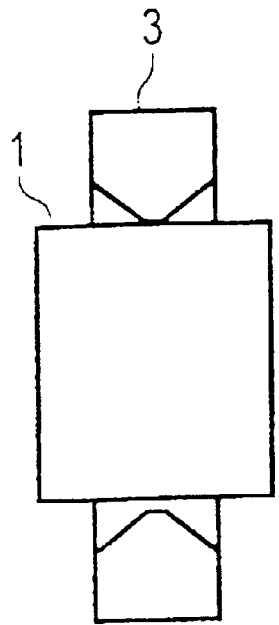
Figure 14C:
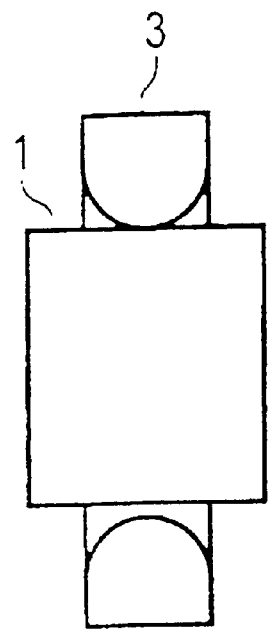

FIGS. 14*a* to 14*c* show variously shaped inner surfaces of the drive ring 3 in sectional representation. For the purpose of optimizing the contact zone to the shaft 1, these can also have a different shape to a cylindrical one, for example pointed (FIG. 14*a*), flattened pointed (FIG. 14*b*), parabolic, hyperbolic, circular (FIG. 14*c*) or conical.

The wobble motor can therefore be operated in the most varied operating modes of the shaft 1, which are listed in the following table in a non-restrictive fashion:

| Rotation | | Linear drive | |
| --- | --- | --- | --- |
| Counter-clockwise rotation | clockwise rotation | positive z-direction | negative z-direction |
| Continuous continuous | | continuous | |
| | | | continuous |
| | continuous | continuous | |
| | continuous | | continuous |
| Stepwise | | stepwise | |
| Stepwise | | | stepwise |
| | stepwise | stepwise | |
| | stepwise | | stepwise |
| no resulting rotation only periodic rotation | | stepwise | |
| no resulting rotation only periodic rotation | | | stepwise |
| no resulting rotation only periodic rotation | | continuous | |
| no resulting rotation only periodic rotation | | | continuous |
| FREEWHEELING | | | |
| BLOCKED (initial state) | | | |

We claim:

1. A wobble motor, comprising:
    at least one shaft guided in a rotatably and axially displaceable fashion and having a longitudinal axis;
    at least one drive ring surrounding said shaft and tilted with respect to said longitudinal axis of said shaft, said at least one drive ring displaced about said shaft in a frictionally locked fashion and free from rotation, said at least one drive ring having a base and a curved surface;
    a tilting unit having at least two actuators connected to said base of said at least one drive ring for tilting said at least one drive ring with respect to the shaft; and
    a rotational unit having at least two actuators connected to said curved surface of said at least one drive ring.

2. The wobble motor according to claim 1, wherein said drive ring has a freely rotatable inner annular shell bearing against said shaft.

3. The wobble motor according to claim 1, wherein said actuators of said tilting unit are aligned substantially parallel to said longitudinal axis of said shaft.

4. The wobble motor according to claim 1, wherein said tilting unit contains at least three of said actuators which are fitted on said at least one drive ring in an angularly symmetrical fashion and at an equal distance.

5. The wobble motor according to claim 1, including at least one drive device having at least two actuators which are not collinearly aligned, said at least one drive unit connected to said at least one drive ring for displacing said at least one drive ring about said shaft.

6. The wobble motor according to claim 5, wherein said at least two actuators of said drive device are disposed perpendicular to said longitudinal axis and at right angles to one another.

7. The wobble motor according to claim 1, wherein at least one of said actuators is an electromechanical actuator including piezoelectric multilayer actuators.

8. The wobble motor according to claim 1, wherein at least one of said actuators is selected from the group of electrostrictive actuators, magnetostrictive actuators, electromagnetic actuators and hydraulic actuators.

9. The wobble motor according to claim 1, including a tilting device and at least one further drive ring disposed parallel to said drive ring, said drive ring and said further drive ring are supported against one another by said tilting device.

10. The wobble motor according to claim 9, wherein a respective contact point of said drive ring and said further drive ring with said shaft is rotated by 180° about said longitudinal axis.

11. The wobble motor according to claim 9, including another drive ring disposed parallel to said drive ring and to said further drive ring, said further drive ring being supported against said drive ring and against said another drive ring with an aid of said tilting device in each case.

12. The wobble motor according to claim 11, wherein said shaft is guided through said drive ring, said further drive ring and said another drive ring without torques.

13. The wobble motor according to claim 1, including at least one bearing and said shaft is guided through said at least one bearing.

14. A wobble motor, comprising:
    at least one shaft guided in a rotatably and axially displaceable fashion and having a longitudinal axis; and
    at least one first drive ring surrounding said shaft and tilted with respect to said longitudinal axis of said shaft, said at least one first drive ring displaced about said shaft in a frictionally locked fashion and free from rotation;
    at least one second drive ring disposed parallel to said at least one first drive ring; and
    a tilting device supporting said at least one first drive ring and said at least one second drive ring against one another.

15. A method for driving a shaft, which comprises the steps of:
    displacing at least one drive ring in an at least partially periodic movement about the shaft in a frictionally locked fashion free from rotation by using a rotational unit having at least two actuators connected to a curved surface of the drive ring; and
    tilting the at least one drive ring with respect to a longitudinal axis of the shaft by using a tilting unit having at least two actuators connected to a base of the drive ring.

16. The method according to claim 15, which comprises displacing the at least one drive ring perpendicularly about the longitudinal axis of the shaft at least temporarily in accordance with one of:

$$x=-(R-r)\cdot\cos(\omega t) y=(R-r)\cdot\sin(\omega t),$$

and $$x=-(R-r)\cdot\cos(\omega t) y=-(R-r)\cdot\sin(\omega t),$$

where:
    r is a radius of the shaft; and
    R is a radius of the at least one drive ring.

17. The method according to claim 15, which comprises periodically tilting the drive ring.

18. The method according to claim 17, which comprises periodically tilting the drive ring at an angular frequency equal to an angular frequency of a periodic displacement of the drive ring.

19. The method according to claim 17, which comprises tilting the drive ring such that a speed of the shaft can be set by selecting a phase angle in a range of $[0;\pi]$.

20. The method according to claim 17, which comprises setting a tilting angle to be less than 2°.

* * * * *